Figure 14:
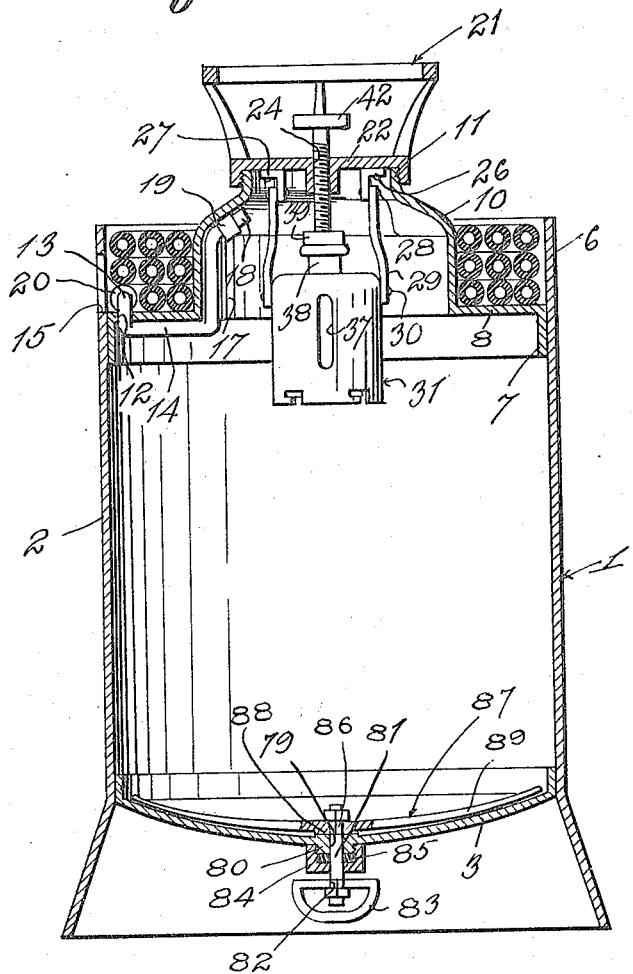

R. N. A. ICKES.
FIRE EXTINGUISHER.
APPLICATION FILED JULY 28, 1915.
1,208,562.
Patented Dec. 12, 1916.
4 SHEETS—SHEET 1.
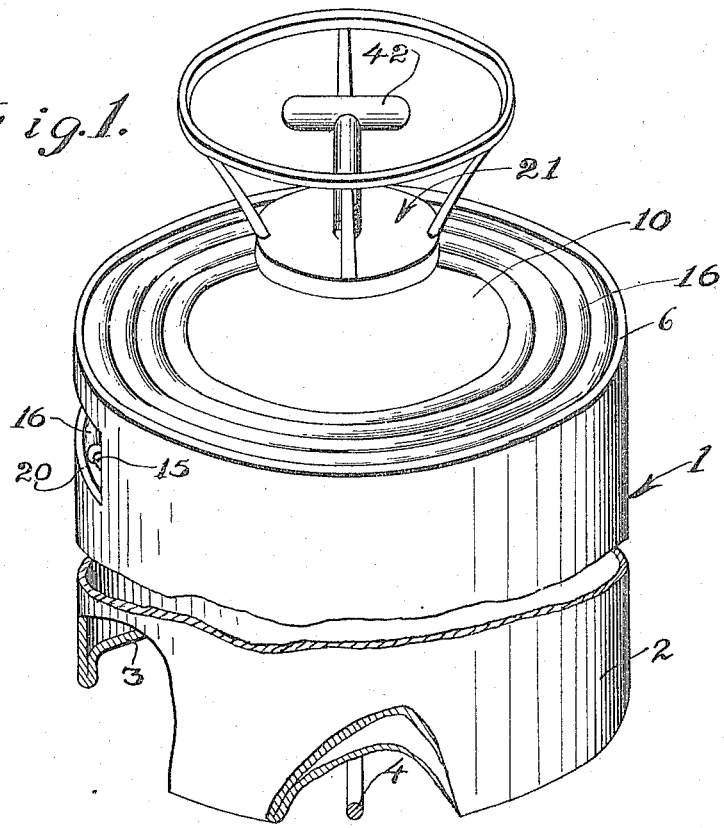
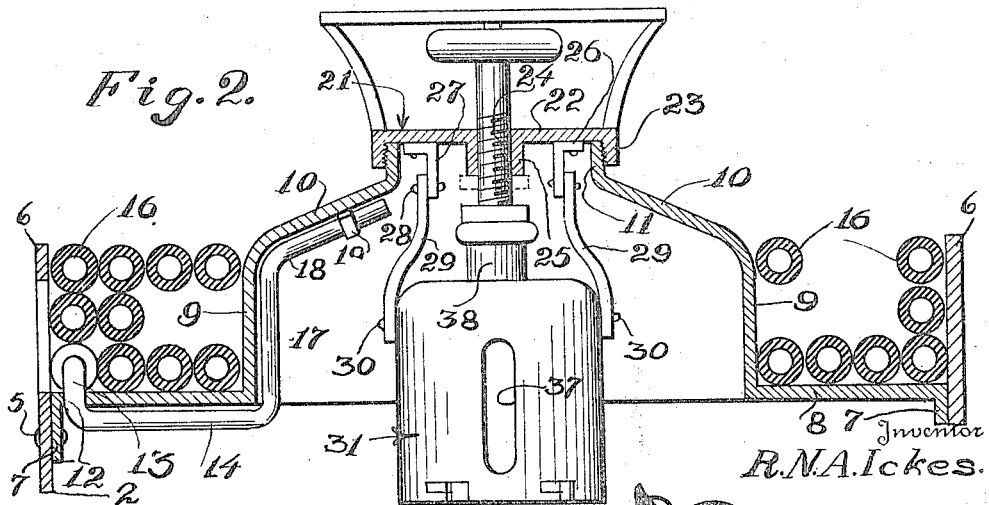

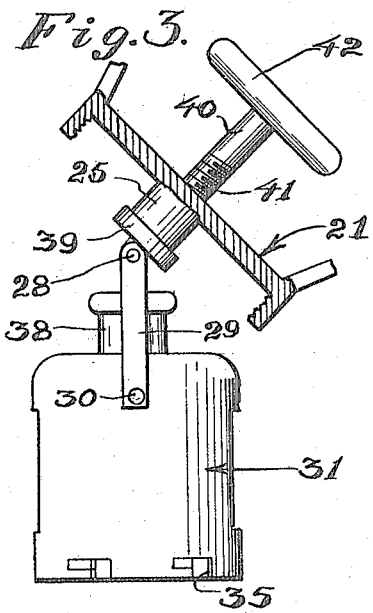
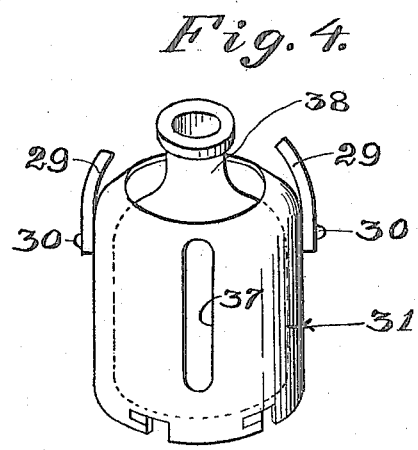
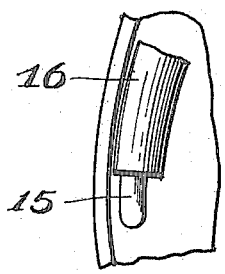
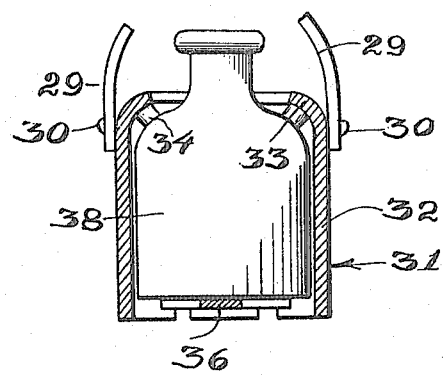
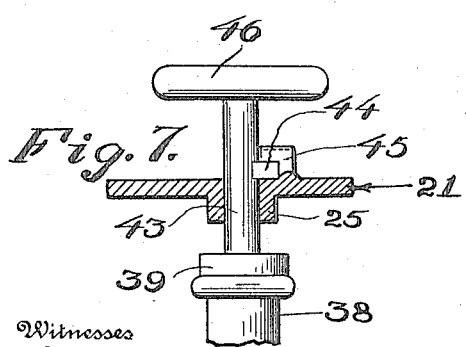

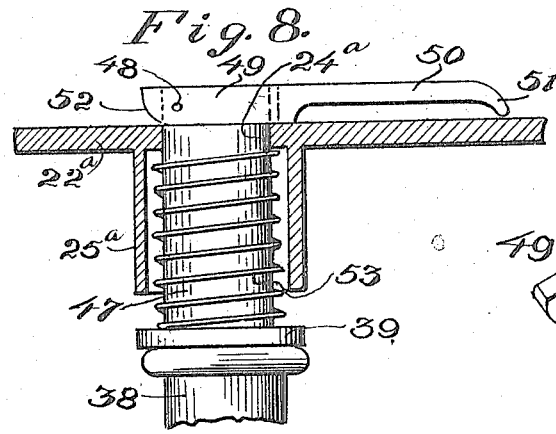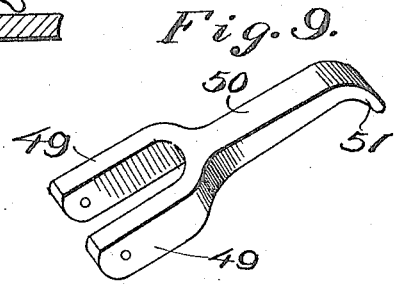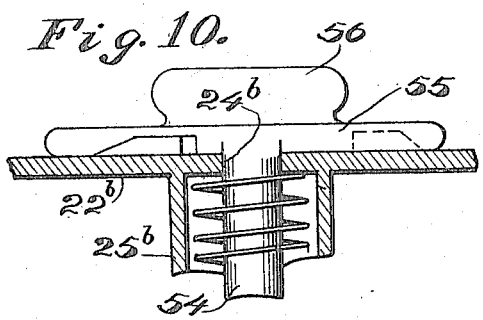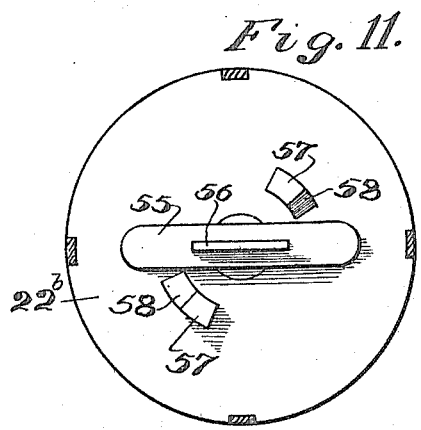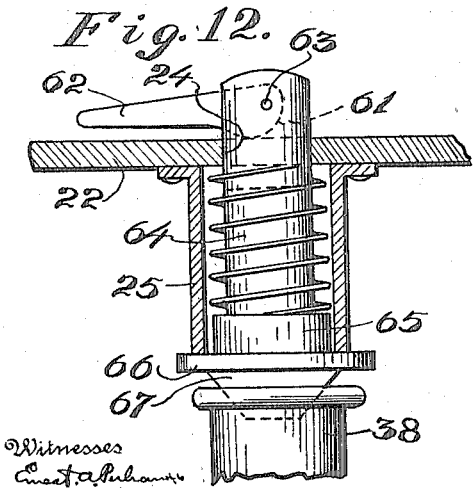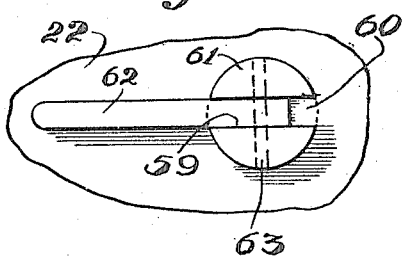

R. N. A. ICKES.
FIRE EXTINGUISHER.
APPLICATION FILED JULY 28, 1915.

1,208,562.

Patented Dec. 12, 1916.
4 SHEETS—SHEET 4.

UNITED STATES PATENT OFFICE.

RAYMOND N. A. ICKES, OF ALTOONA, PENNSYLVANIA.

FIRE-EXTINGUISHER.

1,208,562.   Specification of Letters Patent.   Patented Dec. 12, 1916.

Application filed July 28, 1915. Serial No. 42,337.

*To all whom it may concern:*

Be it known that I, RAYMOND N. A. ICKES, a citizen of the United States, residing at Altoona, in the county of Blair and State of Pennsylvania, have invented certain new and useful Improvements in Fire-Extinguishers; and I do hereby declare the following to be a full, clear, and exact description of the invention, such as will enable others skilled in the art to which it appertains to make and use the same.

This invention relates to new and useful improvements in fire extinguishers and the principal object of the invention is to provide a device wherein the chemicals contained in the various compartments may be agitated, either mechanically or automatically so as to keep the same at their maximum strength, thereby guaranteeing the greatest possible efficiency of the extinguisher.

Another object of the invention is to provide a fire extinguisher, which will be kept at all times at its maximum efficiency since the construction thereof will allow the user to agitate the solution within the extinguisher periodically to prevent precipitation and crystallization of the chemicals so as to avoid depreciation of the strength of the solutions and the efficiency of the extinguisher.

Another object of the invention is to provide a device wherein the life of the extinguisher may be increased indefinitely as the frequent agitation of the various chemicals within the same will prevent deterioration of the material from which the extinguisher is constructed and also avoid deterioration of the chemicals.

Another object of this invention is to provide a device which may be transported without danger to the user as with the present day extinguisher if the user should tilt them while transportating it the same will discharge and if any of the solution should strike the eyes it would completely destroy the sight. My extinguisher does away with this danger.

Another object of this invention is to provide an airtight closure for the acid container so as to prevent the acid from absorbing the fumes or water from the soda solution which would render the acid into carbon dioxid and then when the extinguisher would be placed in service, it would be of no value as the acid had already been decomposed having absorbed the carbonates from the soda solution, and thus the effect thereof would have been destroyed.

A further object of the invention is to provide an extinguisher wherein the mixing of the chemicals is effected manually so as to keep the same constantly in solution by agitation of the extinguisher without endangering the discharge of the extinguisher by the mingling of the solutions.

Heretofore it has been the usual practice to place one of the solutions in the body of the extinguisher and the other solution in a capsule contained in the body and when the extinguisher was agitated or turned over, the capsule would be broken, thereby causing the two chemicals to mix and operating the extinguisher. This invention is designed to avoid possibility of accidental discharge of the extinguisher through agitation as the chemicals will not mix except upon the proper manipulation of the valves controlling the mixing of the chemicals.

A further object of the invention is to provide a positive closure for the acid chamber which cannot become accidentally opened, thereby insuring the user against the discharge of the extinguisher prematurely.

Still another object of the invention is to provide an extinguisher in which it is possible to discontinue the operation at any time by stopping the flow of acid into the soda solution, thereby preventing further decomposition of the chemicals and retaining a part of the solution so that the device may be used at intervals without necessitating the recharging each time the same is placed in operation.

Still another object of the invention is to provide a novel form of valve for closing the acid container which will effectively prevent leakage of the contents of the extinguisher when the same is inverted and which is so designed as to discontinue the operation of the extinguisher at any time without entirely exhausting the supply of chemicals contained therein.

With these and other objects in view the invention consists in the novel combination and arrangement of parts which will be fully set forth in the following specification and accompanying drawings, in which:—

Figure 15:
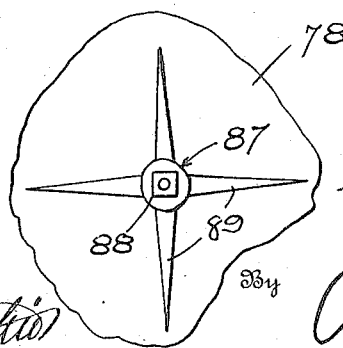

Figure 1 is a perspective view of a fire extinguisher constructed in accordance with this invention. Fig. 2 is a fragmentary vertical sectional view of Fig. 1, illustrating the several parts in their operative position and showing in dotted lines the position of the acid container closure when open. Fig. 3 is a detail view of the acid container and cap for the fire extinguisher showing the two in their relative position for filling. Fig. 4 is a perspective view of the acid container showing the bottle in place. Fig. 5 is a vertical sectional view of the acid container showing the bottle and method of retaining the same in place. Fig. 6 illustrates in detail the method of connecting the hose to the tank. Fig. 7 is a detail view of a modified form of the controlling plunger. Fig. 8 is a view of a modified form of valve and controlling means. Fig. 9 is a perspective view of the controlling lever used in Fig. 8. Fig. 10 is a further modification of valve and controlling means. Fig. 11 is a top plan view of Fig. 10. Fig. 12 is a view of a still further modified form of valve and controlling means. Fig. 13 is a fragmentary top plan view of Fig. 12. Fig. 14 is a vertical sectional view through the extinguisher, and Fig. 15 is a plan view of the interior of the bottom of the device, showing the agitator in detail.

Referring to the drawings by characters of reference, the numeral 1 designates as an entirety the extinguisher which comprises the cylindrical shell 2 which is formed of seamless material and provided with the bottom 3, which is concave as clearly shown in the drawings. This bottom is formed integral with the shell 2, and extending thereacross is a suitable rod 4 which forms a handle by means of which the device may be moved when in its inverted position. Riveted or otherwise secured as at 5 near the upper edge of the cylindrical shell 2, but spaced downwardly therefrom for a short distance to form the wall 6, is a suitable band 7 having the inwardly projecting flange 8 formed at its upper end. This flange projects inwardly for a short distance and terminates in the upstanding flange 9, which extends vertically to a point in a horizontal plane with the upper edge of the wall 6 and is then curved inwardly to form a dome 10 having the collar 11 formed at its upper end, and this collar is externally screw threaded as clearly shown. The portion 6 of the shell 2 and the flanges 8 and 9 form a chamber for the reception of the hose, which chamber extends annularly so that the dome practically forms a core on which the hose may be wound. Extending through the flange 8 near the band 7 is an aperture 12 through which the upturned end 13 of the outlet pipe 14 extends. This upturned end is bent angularly as at 15 and is arranged to extend into the hose 16 and hold the same on the extension 15, thereby forming a connection between the hose and the interior of the extinguisher. The end of the tube 14 opposite the upturned portion 13 is bent upwardly as at 17 to conform to the shape of the flange 9 and is again bent inwardly as at 18 to conform to the shape of the dome 10. This extension 18 is secured to the dome 10 by means of a clamp or other suitable securing means 19, and it will thus be seen that when the device is in its inverted position, substantially the entire amount of liquid contained within the extinguisher will be forced outwardly through the hose, since the opening thereof is located at the lowermost point of the receptacle. A suitable cut-away portion 20 is formed in the wall 6 and is provided at a point in radial alinement with the tube 14 for the purpose of enabling the user to remove the hose from the portion 15 and substitute a new hose therefor should the original become worn or otherwise unfit for use.

The cap used in connection with the device is designated generally by the numeral 21 and comprises the disk 22 having formed thereon the downturned, internally screw threaded flange 23 which extends around the periphery and engages the threads on the flange 11. A suitable central threaded aperture 24 is formed in the disk 22 and is surrounded by the flange 25 which is internally screw threaded. Riveted or otherwise secured as at 26 to the disk 22 are the depending arms 27 to which are pivotally secured as at 28 the arms 29, the lower ends of which are pivotally secured as at 30 to the bottle holder designated generally by the numeral 31. This bottle holder is best illustrated in Figs. 2, 3, 4, and 5, and comprises the metal shell 32 having the upper end inturned as at 33 and provided with the cushion 34. The lower end is formed with the bayonet slots 35 in which the cross arms 36 engage to hold the bottle in place. The body 32 is formed with a pair of diametrically opposed, longitudinal openings 37 which are provided to enable the user to determine the quantity of liquid within the bottle 38.

In order to close the mouth of the bottle, there is provided the washer or disk 39 which is mounted at the end of the stem 40, which stem is provided with the external screw threads 41, which threads coöperate with the internal threads in the collar 25 in holding the stem in place. The upper end of the stem 40 terminates in the hand-hold 42 and when the stem is threaded into the container, it will be seen that the washer will engage the upper end of the neck of the bottle, and when the stem is withdrawn and the bottle neck is opened, it will be apparent that the washer will engage the under edge of the collar 25 and thereby form a closure which will prevent the leakage of liquid around the stem.

In the modified form of controller, the washer 39 is carried on a smooth stem 43 having formed intermediate its ends the lug 44 which engages beneath the keeper 45 formed on the upper face of the disk 22 and thus holds the washer 39 against the bottleneck. When this device is released, the hand-hold 46 is grasped and the stem given a partial turn so that the lug 44 will be brought from beneath the keeper 45 and it will thus be seen that the stem may be pulled outwardly until the washer 39 engages the lower edge of the collar 25 and will thus uncover the mouth of the bottle, thereby permitting the liquid to flow therefrom as soon as the device is in place.

In the modified form of controller illustrated in Fig. 8, the washer 39 is carried on a smooth stem designated by the numeral 47, the upper end of which is reduced and has pivotally secured thereto as at 48, the bifurcated end 49 of the lever 50. The opposite end of this lever is provided with a downturned hook 51 and the ends of the bifurcated portion of the lever provided with the arcuate cam face 52. It will thus be seen that when the lever is thrown upwardly, the cam face will engage the body 22$^a$ of the top or cap and thereby pull the washer 39 from its seat against the bottle neck 38. In order to normally hold the valve 39 seated, the spring 53 is provided and surrounds the stem 47 and one end of the spring abuts the under side of the body 22$^a$ of the hood, while the lower end of the spring abuts the upper face of the washer 39. It will be noted that in this form the collar 25$^a$ is smooth, both on its interior and exterior and is spaced from its stem for a short distance to provide a chamber for the reception of the spring.

In the further modification illustrated in Fig. 10 the collar 25$^b$ is spaced in the usual way and the stem is designated by the numeral 54 and is constructed similar to the stem 43. The upper end of the stem however is provided with the cross bar 55 which in turn is provided on its upper face with the thumb piece 56 and the top 22$^b$ is formed at diametrically opposite points with the upstanding members 57 provided with the inclined cam faces 58 and it will be seen that when the cross bar 55 is turned, the same will engage the cam faces and thereby ride up the same until they engage the upstanding portions 57, thus holding the valve 39 upwardly against the tension of the spring 53.

In the modification shown in Fig. 12, the upper end of the valve stem is bifurcated as at 59 and the top 22 is formed with a pair of relatively semi-circular openings disposed with their flat faces in spaced parallel relation through which the upper ends of the arms formed by the bifurcation extends.

It will thus be seen that a bar 60 will be formed between the openings. The cam face 61 of the lever 62 which is pivoted as at 63 between the bifurcated ends of the stem bears against this bar. It will thus be seen that when the lever is in the position illustrated in Figs. 12 and 13, the valve will be lifted from the mouth of the bottle neck so that it engages the lower edge of the tubular portion 25, thereby permitting the liquid to flow from the bottle and into the container. The modified form of valve in connection with this device is carried at the lower end of the stem hereinbefore described which is designated by the numeral 64 and is provided at its lower end with the enlargement 65. The valve comprises the disk 66 having the frusto-conical portion 67 formed on its under side which forms a plug to fit within the bottle neck and it will be seen that when the valve is seated under the pressure of the spring, surrounding the stem 64 any escape of liquid from the bottle will be prevented.

The bottom of the shell 2 is designated by the numeral 3 and is formed with a central opening 79 surrounding which is a hollow boss 80 which is preferably externally screw threaded as clearly shown in the drawing.

Extending through the opening 79 in the hollow boss 80 is the shaft 81 provided at its outer end with the squared portion 82 on which the handle 83 is secured. A suitable cap 84 is provided and surrounds the packing ring 85 and this cap is threaded on the threads of the boss 80 and clamps the packing ring 85 between the outer end of the boss and the cap. A rectangular portion 86 is formed at the inner end of the shaft 81 and secured on this rectangular portion is the agitator designated generally by the numeral 87 comprising the hub 88, having the arms 89 extending therefrom.

It will be apparent from the foregoing that in use the device is first assembled by placing the desired quantity of liquid within the chamber formed by the shell 2. The coöperating liquid is then placed in the bottle when the cap 21 is in the position shown in Fig. 3, and after the bottle has been filled to the desired point the same is then placed in the dome-shaped portion 10 of the shell 2 and the cap screwed in place. The stem 40 is then pressed downwardly as far as possible so as to force the washer 39 into engagement with the upper end of the bottle, and it will be seen that the device is held against accidental discharge as the two liquids cannot mingle until the device is manually opened. In this way it will be apparent that an extinguisher may be transported without danger of becoming inoperative through accident. As soon as it is necessary to put the device in operation, the hose is unwound and carried to the desired point and the bottle is then uncovered by lifting the washer 39 from its position on the mouth thereof. The whole is then inverted, and it will be apparent that the liquid within the bottle will mingle with the liquid in the chamber 1 and the gas caused thereby will force the liquid from the chamber through the hose, from whence it may be directed to the desired point. It will be evident that substantially the entire quantity of liquid will be forced from the extinguisher as the tube feeding the hose is located at the lowermost point and thus forms a siphon action so long as there is any liquid within the device.

It is to be understood that when the extinguisher is not in use, the same is to be shaken so as to agitate the chemicals and keep them at their maximum stage, thereby insuring the greatest possible efficiency of the extinguisher. In order to further assist in maintaining the mixture in the chamber 68 and maintain the contents thereof at their greatest efficiency so as to prevent crystallization and precipitation of the chemicals, the agitator 87 is periodically turned so as to scrape the bottom 78 of the extinguisher and thereby prevent the crystals from adhering to the bottom. Upon shaking the device it will be noted that the crystals thus described will be again dissolved and the same suspended in a solution.

While in the foregoing there has been shown and described the preferred embodiment of this invention, it is to be understood that such changes may be made in the combination and arrangement of parts as will fall within the spirit and scope of the appended claims.

What is claimed is:—

1. A fire extinguisher of the character described comprising a cylindrical body forming a liquid receiving chamber, a cover having a dome-shaped portion secured at one end of the body and a flange on the cover, said flange being spaced downwardly from the upper edge of the body to form an annular trough for the reception of a hose, a cap removably secured to the highest point of the dome, a pipe leading from the highest point of the dome out through the flange and being connected to the hose, a liquid container carried by the cap, and means to control the passage of liquid from the container into the chamber.

2. A fire extinguisher comprising a shell, a bottom for said shell, a top for the shell, said top being spaced downwardly upon the upper edge of the shell, a dome-shaped portion centrally of the top, said dome-shaped portion coöperating with the part of the shell projecting above the top in forming an annular trough, a hose adapted to lie in said trough, a pipe leading from the interior of the extinguisher to the hose, the dome-shaped portion being provided with a central filling opening, a cap for closing said filling opening an acid container supported by the cap, means to control the flow of acid from the container, a bottom for the shell, said bottom being provided with a central opening, a shaft rotatably mounted in the opening, a handle on the outer end of the shaft, and an agitator on the inner end of the shaft whereby when the handle is turned the agitator will stir the contents of the shell to prevent crystallization and precipitation of the constituents of said contents to keep the same at its maximum strength.

3. A fire extinguisher of the character described comprising a cylindrical body forming a liquid-receiving chamber in which the contents will be agitated so as to keep them at their maximum strength, a cover secured to the upper end of the body having a dome-shape portion and a flange on the dome shaped portion, said flange being spaced downwardly from the upper edge of the body to form an annular trough for the reception of a hose that may vary in length, a removable cap secured at the highest point of the dome, said cap carrying a valve and stem which enables the user to control the flow of liquid so as to turn it off and on when desired, said cap allowing the mixing of the chemicals contained within and also allowing the agitation of said chemicals without mixing, a pipe leading from the highest point of the dome out through the flange and being connected to the hose, a scraper situated on the interior of the bottom of the extinguisher which will cause the crystallized substances to be freed from the bottom of the extinguisher, and a liquid container having a removable cap at the top which will allow the chemicals to mix when opened.

In testimony whereof I affix my signature in presence of two witnesses.

RAYMOND N. A. ICKES.

Witnesses:
G. A. ICKES,
ELMER A. HITE.